No. 788,379. PATENTED APR. 25, 1905.
A. L. RICH.
METHOD OF ROCK FACING.
APPLICATION FILED JAN. 9, 1905.
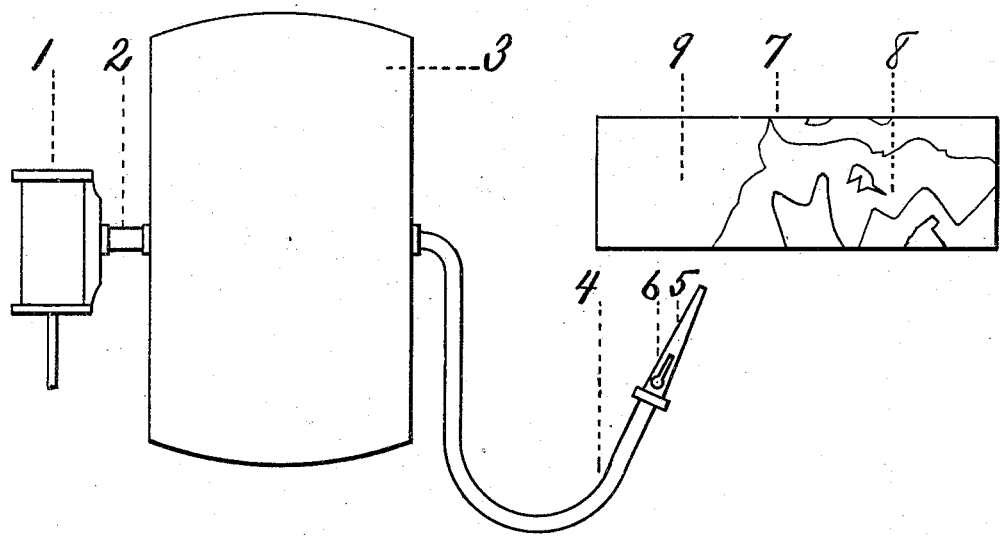

No. 788,379. Patented April 25, 1905.

UNITED STATES PATENT OFFICE.

ABRAHAM L. RICH, OF PITTSBURG, PENNSYLVANIA.

METHOD OF ROCK-FACING.

SPECIFICATION forming part of Letters Patent No. 788,379, dated April 25, 1905.

Application filed January 9, 1905. Serial No. 240,170.

*To all whom it may concern:*

Be it known that I, ABRAHAM L. RICH, a citizen of the United States, residing at Pittsburg, in the county of Allegheny and State of Pennsylvania, have invented a new and useful Method of Rock-Facing, of which the following is a specification accompanied by a drawing, in which the figure is a side view illustrating my invention.

My invention relates to the production of a rock face on artificial-stone or cement building-blocks.

Artificial-stone or cement building-blocks are made by introducing a mixture of cement and damp sand or sand and finely-broken stone into a mold, wherein it is tamped to the desired density and then removed on a pallet upon which it is supported, water being added to it daily for about ten days or until it will absorb no more, by which time the mass has set with extreme hardness.

The prevailing means now in use for producing an imitation-rock face consist in molding it thereon, one of the surfaces of the mold in which the block is formed being shaped to resemble a natural cleavage or rock face. The lines, angles, and surfaces have, however, a rounded, dull, and smooth effect which can easily be distinguished from the sharp, well-defined, and rough effect of the natural cleavage. When set in the wall, there is a lack of diversity in appearance, although usually about six different patterns are used. There have also been some attempts at producing a rock face by splitting the blocks as soon as formed and before removing from the molds; but this requires too much time and the results are uncertain and not satisfactory.

Referring to the drawings, 1 represents an air-pump operated by any suitable power, connected by a pipe 2 to a reservoir 3, in which the fluid can be maintained at any desirable pressure—say a few ounces, ten, thirty, sixty, one hundred, or more pounds to the square inch. Attached to reservoir 3 is a pipe 4, preferably a flexible one, said pipe terminating in a nozzle 5, having a suitable valve 6. Said nozzle 5 is shaped so that the fluid is emitted at the greatest velocity that the degree of pressure in the reservoir 3 will produce. The nozzle 5 is not limited to any particular form of construction. It may have a single circular orifice, a plurality of such orifices, or may be constructed with an elongated slitted opening.

The operation of my invention is as follows: The block 7 having been molded, the fluid which has been raised by the pump 1 to the desired pressure in the reservoir 3 (sixty pounds per square inch gives excellent results) is permitted to escape through the pipe 4 and nozzle 5 under control of the valve 6, said nozzle 5 being disposed so that the fluid projected therefrom under pressure will impinge on the desired surface of the block, so as to efface the molded surface of the block by cutting said surface away and produce thereon an original or rock face. Atmospheric air is the preferable fluid to be used; but any aeriform fluid which does not exert a solvent or liquefying effect on the block will suffice. Fluid in the liquid state—for instance, water—can be used; but the application of the latter has a washing effect and introduces too much moisture, tending to collapse the block when applied too soon after it has been molded and before the cement has set to any extent.

In the drawing, 8 represents the portion of the surface of the block which has been rock-faced, and 9 the portion upon which the fluid has not been projected.

Having described my invention, what I claim as new, and desire to secure by Letters Patent, is—

1. The method of rock-facing, consisting of projecting fluid under pressure, so that it will impinge on the surface of the block and cut said surface away, thereby rock-facing it, substantially as herein set forth.

2. The method of rock-facing, consisting of projecting an aeriform fluid under pressure, so that it will impinge on the surface of the block and cut said surface away, thereby rock-facing it, substantially as herein set forth.

ABRAHAM L. RICH.

Witnesses:
FREDERICK HALL,
ALONZO O. PYLE.